United States Patent
Xu et al.

(10) Patent No.: US 10,545,893 B1
(45) Date of Patent: Jan. 28, 2020

(54) INTERRUPT CONTROLLER AND METHOD OF OPERATION OF AN INTERRUPT CONTROLLER

(71) Applicant: Arm Limited, Cambridge (GB)

(72) Inventors: Zheng Xu, Austin, TX (US); Abdul Ghani Kanawati, Austin, TX (US); Timothy Nicholas Hay, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/245,337

(22) Filed: Jan. 11, 2019

(51) Int. Cl.
*G06F 13/26* (2006.01)
*G06F 11/16* (2006.01)
(Continued)

(52) U.S. Cl.
CPC .......... *G06F 13/26* (2013.01); *G06F 11/1641* (2013.01); *G06F 11/1675* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 8,407,387 B2 * | 3/2013 | Adachi | .................. | G06F 13/26 710/264 |
| 8,793,423 B2 * | 7/2014 | Zheng | .................... | G06F 13/26 710/264 |

(Continued)

*Primary Examiner* — Raymond N Phan
(74) *Attorney, Agent, or Firm* — Nixon & Vanderhye P.C.

(57) ABSTRACT

An interrupt controller, and method of operation of such an interrupt controller, are provided. The interrupt controller has an interrupt source interface for receiving interrupts from one or more interrupt sources, and a plurality of output interfaces, where each output interface is associated with a processing device that can execute an interrupt service routine to process an interrupt request issued to that processing device. The interrupt source interface has transaction generation circuitry to generate, for each received interrupt, an original transaction to represent the interrupt and a duplicate transaction to represent the interrupt. Buffer circuitry then buffers the original transaction and the duplicate transaction for each received interrupt, and selection circuitry is provided for selecting transactions from the buffer circuitry, and for routing each selected transaction for receipt by the output interface identified by an address portion of the selected transaction. Each output interface has queue storage comprising a plurality of queue entries, where each queue entry is allocated to a transaction received by the output interface and is used to store interrupt identifying information provided by a data portion of the transaction. The queue storage is arranged to maintain duplication tracking information to identify when both the original transaction and its associated duplicate transaction have been received by the output interface. Each output interface inhibits issuing an output signal that would cause an interrupt request for the original transaction to be sent to the associated processing device, until the duplication tracking information identifies that both the original transaction and the associated duplicate transaction have been received by that output interface. This provides an efficient functional safety compliant design for an interrupt controller.

25 Claims, 10 Drawing Sheets

(51) Int. Cl.
*G06F 15/17* (2006.01)
*G06F 11/20* (2006.01)

(52) U.S. Cl.
CPC ......... *G06F 11/2043* (2013.01); *G06F 15/17* (2013.01); *G06F 2213/24* (2013.01); *G06F 2213/2412* (2013.01); *G06F 2213/2414* (2013.01)

(56) References Cited

U.S. PATENT DOCUMENTS

| | | | | |
|---|---|---|---|---|
| 9,021,172 | B2* | 4/2015 | Horsnell | G06F 13/24 710/260 |
| 9,043,520 | B2* | 5/2015 | Yamashita | G06F 9/4812 710/267 |
| 2014/0122759 | A1* | 5/2014 | Machnicki | G06F 13/24 710/261 |
| 2014/0223059 | A1* | 8/2014 | Marietta | G06F 9/4812 710/261 |
| 2019/0258251 | A1* | 8/2019 | Ditty | G05D 1/0088 |

\* cited by examiner

INTERRUPT CONTROLLER AND METHOD OF OPERATION OF AN INTERRUPT CONTROLLER

BACKGROUND

The present technique relates to an interrupt controller and a method of operating such an interrupt controller, and in particular relates to the design of an interrupt controller that can be used in functional safety implementations.

Functional safety is becoming an important aspect of modern data processing system design. In order to ensure designs meet the functional safety requirements, it is generally necessary to provide for a high level of fault detection coverage. Purely by way of example, in the automotive field the Standard ISO 26262 entitled "Road Vehicles—Functional Safety" is an international Standard for functional safety of electrical and/or electronics systems in production automobiles, and that Standard defines a number of Automotive Safety Integrity Levels (ASILs). ASIL D dictates the highest integrity requirements, and requires 99% fault detection.

Traditionally, designers resort to spatial redundancy such as Dual-Core-Lock-Step (DCLS) to achieve such high levels of fault detection. In accordance with such a design, two processor cores operate in lockstep and any discrepancy in their output is used to indicate an error. However, duplicating all of the components of the processor cores in such a design could potentially introduce significant area and power overhead. This is becoming a significant issue in modern systems, as more performance and features are added into those systems, resulting in an increase in the die size and power consumption.

One of the components that would potentially need duplicating in such a functional safety system is the interrupt controller. However, there is a significant area penalty associated with duplicating the interrupt controller design within such a system.

It would accordingly be desirable to provide an improved technique for handling interrupts within safety critical systems.

SUMMARY

In one example arrangement, there is provided an interrupt controller comprising: an interrupt source interface to receive interrupts from one or more interrupt sources; a plurality of output interfaces, each output interface being associated with a processing device that is arranged to execute an interrupt service routine to process an interrupt request issued to that processing device; the interrupt source interface comprising transaction generation circuitry that is arranged, for each received interrupt, to generate an original transaction to represent the interrupt and a duplicate transaction to represent the interrupt; buffer circuitry to buffer the original transaction and the duplicate transaction for each received interrupt; and selection circuitry to select transactions from the buffer circuitry and to route each selected transaction for receipt by the output interface identified by an address portion of that selected transaction; each output interface having queue storage, the queue storage comprising a plurality of queue entries, each queue entry being allocated to a transaction received by the output interface and used to store interrupt identifying information provided by a data portion of the transaction, and the queue storage being arranged to maintain duplication tracking information to identify when both the original transaction and its associated duplicate transaction have been received by the output interface; wherein each output interface is arranged to inhibit issuing an output signal to cause an interrupt request for the original transaction to be sent to the associated processing device until the duplication tracking information identifies that both the original transaction and the associated duplicate transaction have been received by that output interface.

In another example arrangement, there is provided a method of operating an interrupt controller, comprising: receiving at an interrupt source interface interrupts from one or more interrupt sources; providing a plurality of output interfaces, each output interface being associated with a processing device that is arranged to execute an interrupt service routine to process an interrupt request issued to that processing device; employing transaction generation circuitry, for each received interrupt at the interrupt source interface, to generate an original transaction to represent the interrupt and a duplicate transaction to represent the interrupt; buffering in buffer storage the original transaction and the duplicate transaction for each received interrupt; selecting transactions from the buffer storage, and routing each selected transaction for receipt by the output interface identified by an address portion of that selected transaction; providing each output interface with queue storage, the queue storage comprising a plurality of queue entries, each queue entry being allocated to a transaction received by the output interface and used to store interrupt identifying information provided by a data portion of the transaction; maintaining, in the queue storage, duplication tracking information to identify when both the original transaction and its associated duplicate transaction have been received by the output interface; and causing each output interface to inhibit issuing an output signal to cause an interrupt request for the original transaction to be sent to the associated processing device until the duplication tracking information identifies that both the original transaction and the associated duplicate transaction have been received by that output interface.

In a still further example arrangement, there is provided an interrupt controller comprising: interrupt source interface means for receiving interrupts from one or more interrupt sources; a plurality of output interface means, each output interface means for associating with a processing device that is arranged to execute an interrupt service routine to process an interrupt request issued to that processing device; the interrupt source interface means comprising transaction generation means for generating, for each received interrupt, an original transaction to represent the interrupt and a duplicate transaction to represent the interrupt; buffer means for buffering the original transaction and the duplicate transaction for each received interrupt; and selection means for selecting transactions from the buffer means and for routing each selected transaction for receipt by the output interface means identified by an address portion of that selected transaction; each output interface means having queue storage means, the queue storage means comprising a plurality of queue entries, each queue entry being allocated to a transaction received by the output interface means and used to store interrupt identifying information provided by a data portion of the transaction, and the queue storage means for maintaining duplication tracking information to identify when both the original transaction and its associated duplicate transaction have been received by the output interface means; wherein each output interface means is arranged to inhibit issuing an output signal to cause an interrupt request for the original transaction to be sent to the associated processing device until the duplication tracking information identifies that both the original transaction and the associated duplicate transaction have been received by that output interface means.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
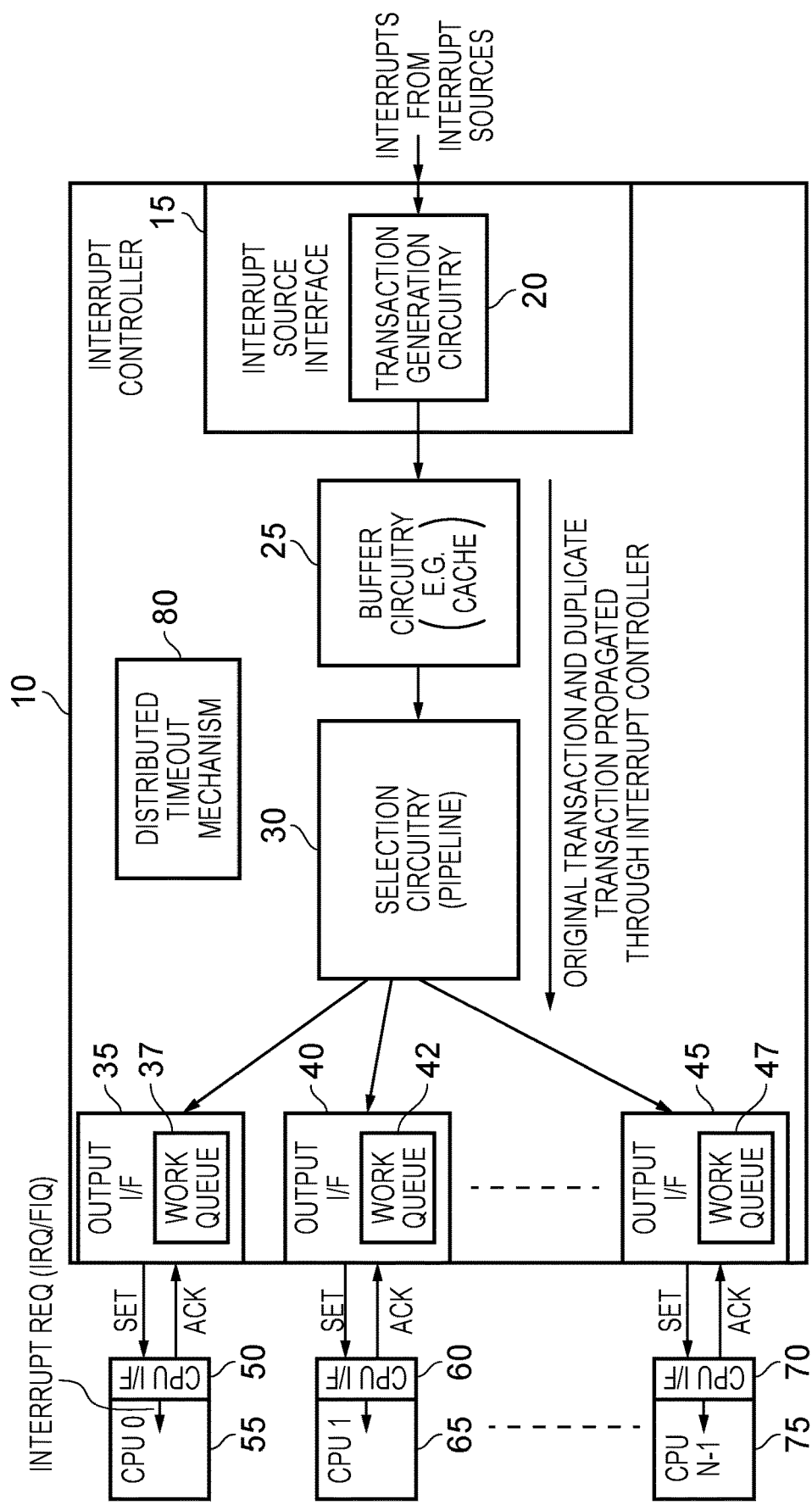
FIG. 1 is a block diagram illustrating components within an interrupt controller in accordance with one example arrangement.

As mentioned earlier, to provide functional safety in relation to an interrupt controller, it would typically be considered necessary to duplicate the interrupt controller, resulting in significant area penalty.

As an alternative, one could provide two interrupt lines from the interrupt controller to a processor core for each physical interrupt. A particular interrupt could then be delivered twice to the processor core, and when the interrupt service routine is executed on the core for each interrupt, it may be configured to understand that the second interrupt is a duplicate of the first interrupt. A physical interrupt would be reliably received if both interrupts (i.e. the original and the duplicate) are received properly by the same processor core. However, a disadvantage of such a technique is that it would involve the interrupt service routine being invoked twice within the processor core for each physical interrupt, hence resulting in a significant performance penalty.

In one example configuration an interrupt controller is provided that has an interrupt source interface for receiving interrupts from one or more interrupt sources. The interrupt sources can take a wide variety of different forms, and may for example be a number of peripheral devices within a system incorporating the interrupt controller. The system will also include one or more processing devices, for example processor cores, and the main function of the interrupt controller is to deliver each interrupt reliably from the various interrupt sources to an appropriate processing device, that processing device then being arranged to execute an interrupt service routine to process the interrupt.

The interrupt controller also has a plurality of output interfaces, each output interface being associated with a processing device. When an interrupt request is issued to a processing device, that processing device will be arranged to execute an interrupt service routine, and delivery of such an interrupt request to the processing device is controlled by the associated output interface (typically by the output interface interacting with a processing device interface).

The interrupt source interface comprises transaction generation circuitry that is arranged, for each received interrupt, to generate an original transaction to represent the interrupt and a duplicate transaction to represent the interrupt. Hence, within the interrupt controller the various received interrupts are handled as transactions, and internally within the interrupt controller each transaction is actually duplicated.

The interrupt controller further has buffer circuitry to buffer both the original transaction and the duplicate transaction for each received interrupt, and selection circuitry that selects transactions from the buffer circuitry, and routes each selected transaction for receipt by the output interface identified by an address portion of the selected transaction. In particular, based on knowledge as to which processing device is to process any particular interrupt, then at the time the transaction is generated for that interrupt its address portion can be arranged to identify the corresponding output interface for that processing device, so as to enable the transaction to be routed through the interrupt controller to the appropriate output interface.

The selection circuitry can take a variety of forms, but typically will have a pipelined structure. As a result, it will be appreciated that a number of pending transactions can be "in flight" within the interrupt controller at any particular point in time.

Each output interface is arranged to have queue storage, the queue storage comprising a plurality of queue entries, where each queue entry is allocated to a transaction received by the output interface. That queue entry is then used to store interrupt identifying information provided by a data portion of the transaction. In accordance with the techniques described herein the queue storage is arranged to maintain duplication tracking information to identify when both the original transaction and its associated duplicate transaction have been received by the output interface.

In accordance with the techniques described herein, each output interface is arranged to inhibit issuing an output signal that would cause an interrupt request for the original transaction to be sent to the associated processing device, until the duplication tracking information identifies that both the original transaction and the associated duplicate transaction have been received by that output interface.

Hence, in accordance with the techniques described herein, for each received interrupt, duplicate transactions are generated internally within the interrupt controller, and only when both of those transactions have been processed correctly within the interrupt controller, and routed to the appropriate output interface, will the output interface be able to issue an output signal that causes an interrupt signal to be sent to the associated processing device. By adopting such a technique, there is only ultimately a need to send a single interrupt request to the processing device and accordingly the interrupt service routine is only invoked once within the processing device for each interrupt. This significantly reduces the performance impact, and also results in a technique that is transparent to the software executing on the processing devices. Further, it has been found that the extra area overhead of the proposed design is negligible. In addition, the impact on the performance of the interrupt delivery process has been found to be acceptable in many situations, that performance depending on the interrupt data flow bandwidth within the interrupt controller.

Accordingly, through the adoption of such a technique, this avoids full duplication of the interrupt controller in order to provide functional safety, and enables functional safety to be achieved without needing to send duplicate interrupt requests to the processing device, and hence without needing to invoke the interrupt service routine multiple times within the processing device for each interrupt.

Whilst in one implementation the original transaction and the associated duplicate transaction could be allocated to different queue entries within the queue storage, with the duplication tracking information linking those queue entries, in one example implementation the original transaction and the associated duplicate transaction are allocated to the same queue entry within the queue storage, and each queue entry comprises a tracking field to maintain the duplication tracking information for the original transaction and the associated duplicate transaction allocated to that queue entry. This provides a particularly efficient design by avoiding a proliferation in the number of queue entries within the queue storage of each output interface.

The tracking field can take a variety of forms but in one example implementation is a two-bit field comprising a first bit which is set when the original transaction is received and a second bit which is set when the associated duplicate transaction is received. Hence, it will be appreciated that there is minimal area overhead required within the queue storage of each output interface to track receipt of both the original transaction and the associated duplicate transaction.

The selection circuitry can be arranged in a variety of ways, but in one example implementation is arranged such that there is a temporal separation between selection of the original transaction and the selection of the associated duplicate transaction from the buffer circuitry. This provides enhanced resilience to errors when processing interrupts within the interrupt controller. For example, transient faults such as may be caused by single event upsets (SEUs) will typically only affect one of the two transactions, and hence are likely to cause the error to be detected by the interrupt controller. For instance, the extent the single event upset affects the address field of a transaction, the original transaction and duplicate transaction may not be received by the same output interface, which will in due course give rise to an error. For instance, a timeout mechanism can be used for this purpose, so that if both the original and duplicate transactions are not received at the same output interface within a specified time period an error is raised. Similarly, if the single event upset triggers a change in the data portion of one of the transactions, this can again be detected within the interrupt controller and cause an error condition to be triggered. For instance the data portions of the original and duplicate transactions can be compared at the output interface to check that they carry the same interrupt attribute information.

The buffer circuitry used to buffer both the original transaction and the duplicate transaction for each received interrupt can be arranged in a variety of ways. For example, the buffer circuitry may comprise a plurality of buffer entries and the original transaction and the associated duplicate transaction may be allocated to separate buffer entries within the buffer circuitry. It may be required that both the original transaction and the associated duplicate transaction have been received by the buffer circuitry before the selection circuitry can select either of those transactions from the buffer circuitry.

In one example implementation, in order to reduce the effective size requirements of the buffer circuitry, the original transaction and the associated duplicate transaction are allocated to a single buffer entry within the buffer circuitry. Each buffer entry is then provided with a buffer tracking field to identify when the original transaction and the associated duplicated transaction have been correctly received by the buffer circuitry. This provides for a compact mechanism for maintaining both transactions within the buffer circuitry. In one example implementation, the selection circuitry is prevented from selecting either the original transaction or the duplicate transaction from the buffer circuitry until the buffer tracking field identifies that both the original transaction and its associated duplicate transaction have been received correctly by the buffer circuitry. When the second transaction (from amongst the original and duplicate transactions) is received, the content of the second transaction can be checked against the first transaction before updating the relevant buffer entry, and hence the buffer will only be updated to identify that both transactions have been received if the transactions match.

As a result of the above mechanism, a buffer entry can only be chosen once both the original and duplicate transactions have been correctly received. Then, in one example arrangement, as each of the original transaction and the associated duplicate transaction for a chosen buffer entry are selected by the selection circuitry, the buffer tracking field is updated to identify that selection.

In one example implementation, any particular buffer entry is available for reallocation once the buffer tracking field identifies that both the original transaction and associated duplicate transaction currently allocated to the chosen buffer entry have been selected by the selection circuitry.

If desired, error correction techniques can be employed in association with the buffer circuitry. For instance, an error correction mechanism (such as for example an error correction code (ECC) scheme) may be associated with each buffer entry, and used to facilitate correction of errors in information maintained in the buffer tracking field. Indeed, in some implementations the error correction mechanism can be used to protect against errors in any of the information maintained within the associated buffer entry.

There are a number of ways in which the duplicate transaction can be distinguished from the associated original transaction. For example, the duplicate transaction may include a duplication attribute to identify it as a duplicate transaction, and the duplication attribute is retained by the duplicate transaction as that duplicate transaction passes through the interrupt controller. The duplication attribute could be provided as a sideband signal that propagates with the duplicate transaction and the internal transaction format may include a duplication field, with a first value indicating that the transaction is the original transaction and a second value indicating that the transaction is the duplicate transaction.

There are a number of ways in which each output interface can be coupled with the associated processing device so as to enable issuance of an output signal from that output interface to cause an interrupt request to be sent to the processing device. In one example arrangement each output interface is coupled to a processing device interface for the associated processing device. The output interface is then arranged to issue the output signal to the processing device interface, with the output signal specifying the interrupt identifying information provided by the data portion of the original transaction for which the output signal is being issued (as mentioned earlier this information being maintained within a queue entry of the queue storage of the output interface). Receipt of the output signal by the processing device interface causes the processing device interface to assert an interrupt request to the processing device.

In accordance with such an implementation, the output interface may then be responsive to receipt of an acknowledgement signal from the processing device interface indicating that the processing device has accepted the interrupt request, to remove the associated original transaction and duplicate transaction from the queue storage.

In the above described implementation, there is an effective handshake mechanism between the output interface and the corresponding processing device interface, in that the processing device interface issues an acknowledgement signal in response to the output signal asserted from the output interface. To further enhance fault detection within the interrupt controller, the output interface may be arranged to start a timer when the output signal is issued, and in the absence of receipt of the acknowledgement signal by a time the timer reaches a chosen threshold value, the output interface may be arranged to identify an error condition. Hence, if the output signal is not responded to as expected, then an error condition can be identified.

If desired, each output interface may be arranged to employ an error detection scheme to identify an error condition when a difference between the original transaction and the associated duplicate transaction is detected. In one implementation, transactions will be paired if they target the same output interface (have the same address portion), and contain the same interrupt attribute information (i.e. the data portions match). Hence, a received transaction needs to be compared against all the previously received transactions having an active queue entry in the queue storage of the output interface in order to seek to find the matching entry (if a queue entry already has the original and duplicate transactions marked as received, that entry can be omitted from the check).

If a transaction is not paired, then it will in one example implementation be allocated a new entry. The reason for the transaction not being paired could be due to it being the first transaction of a pair to be delivered to the output interface (legitimate case), or due to an error in the transaction (an error case) which could for example cause the transaction to be delivered to the wrong output interface due to an error in the address portion, or a match in its data portion not being detected with a transaction stored in an existing entry due to an error in the data portion. In due course, the error detection mechanism can distinguish such an error case from a legitimate case (for example by detecting that a matching transaction has not been received within a given time period), and signal an error.

In addition to detecting errors using the mechanism discussed above, the error detection scheme can also be enhanced by employing a parity bit checking scheme. When adopting such a parity bit checking scheme, if the parity checking scheme identifies a problem with the data portion of the received transaction, this is sufficient to warrant identification of an error condition without needing to allocate an entry for that received transaction and await a timeout.

In one example implementation, a time-out mechanism may be employed to provide fault detection within the interrupt controller. For example, in one implementation, the transaction generation circuitry at the interrupt source may be arranged, when processing a received interrupt, to determine an expiry time with reference to a generation time, and to incorporate an indication of the expiry time as an attribute of the generated original transaction and associated duplicate transaction. Then at one or more locations within the interrupt controller, the expiry time may be compared against a compare time to determine if the expiry time has been reached, and in the event that the expiry time has been reached the interrupt controller may be arranged to identify an error condition. Hence, by including an expiry time as a field of the transaction, this enables a check to be made at various locations within the interrupt controller in order to ensure that the transaction is processed in a timely manner. Absence of processing of the interrupt within a timely manner may be indicative of a fault, and accordingly an error condition can be triggered.

There are a number of ways in which the generation time and the compare time can be generated. In one example implementation the generation time and the compare time are determined from a value of a counter. A global timer could be used in one implementation, or alternatively multiple synchronised timer counters could be distributed at different places within the design.

The expiry time can be determined in a variety of ways, but in one example implementation, is determined by adding a chosen offset to the generation time. The chosen offset can be selected having regard to a maximum expected time that will be taken to process the interrupt within the interrupt controller in accordance with normal operation.

The locations at which the expiry time may be compared against a compare time to determine if the expiry time has been reached can be chosen dependent on implementation. In one example implementation, such locations comprise at least each output interface, enabling the error condition to be identified when at least one of the original transaction and the associated duplicate transaction are processed by the output interface after the expiry time has been reached.

The interrupt controller will include one or more storage structures in which pending transaction are temporarily stored, for example the earlier-mentioned buffer circuitry that buffers the original and duplicate transactions for each received interrupt as generated by the transaction generation circuitry, or the work queues maintained in each of the output interfaces. It is possible that some entries are never read out from such storage structures, which would also be indicative of an error condition. Accordingly, in one example arrangement, the interrupt controller may further comprise scrubbing circuitry to review entries in one or more storage structures of the interrupt controller to determine presence of the error condition if an entry stores a transaction whose associated expiry time has been reached. The scrubbing circuitry can take a variety of forms, but may employ a tracking mechanism to track which entries have been reviewed. Hence, through use of such a mechanism, it is possible to identify when entries store a transaction whose expiry time has been reached without that transaction having been read out of the storage structure.

The interrupt source interface can take a variety of forms. In one example implementation, the interrupt source interface comprises dedicated signal interrupt interface circuitry associated with received interrupts that are provided by dedicated signals on a group of input lines. An example of a type of interrupt that might be received over such dedicated signal lines is shared peripheral interrupts (SPIs) received from peripheral devices.

In one example implementation, the group of input lines are duplicated to cause each interrupt to be received twice by the dedicated signal interrupt interface circuitry. Such an approach is used to ensure that the scheme described herein works for both edge sensitive and level sensitive interrupts.

The dedicated signal interrupt interface circuitry can take a variety of forms, but in one example implementation comprises collator circuitry to convert each received interrupt into a corresponding original transaction and associated duplicate transaction. In particular, based on the input line asserted, the collator block can determine the type of interrupt and the destination for the interrupt, and based on that information can generate the original and duplicate transactions.

As an alternative to the above form of interrupt source interface, or in addition thereto, the interrupt source interface may comprise transaction interrupt interface circuitry associated with received interrupts that are provided as transactions, each received transaction being processed by the transaction interrupt interface circuitry to form a corresponding original transaction and associated duplicate transaction. Hence, rather than using dedicated signal lines, some interrupts may be received in the form of a transaction. Such interrupts may also be referred to herein as message based interrupts (MBIs). In accordance with such message based interrupt schemes, a peripheral device may write to a register within the interrupt controller to register an interrupt. An example of such messaged based interrupts is locality-specific peripheral interrupts (LPIs).

Hence, in such implementations, the transaction interrupt interface circuitry converts the received transaction into an internal format transaction, and creates duplicated versions of the internal format transaction.

The transaction interrupt interface circuitry can take a variety of forms, but in one implementation comprises interrupt translation circuitry to convert interrupt information provided in the received transaction into the address portion of the original transaction and the duplicate transaction used to identify the output interface to which the original transaction and the duplicate transaction should be routed. The interrupt translation circuitry performs a logical to physical interrupt binding in order to map the received interrupts to interrupt identifiers and associated information used to form the data portion of the transaction, and to identify the appropriate output interface to be indicated by the address portion of the transaction.

The processing devices associated with each output interface can take a variety of forms. In one implementation, there is a separate output interface provided for each physical processor core.

Particular examples will now be described with reference to the Figures.

FIG. 1 is a block diagram of an interrupt controller 10 in accordance with one example implementation. The interrupt controller 10 has an interrupt source interface 15 for receiving interrupts from various interrupt sources. The interrupt sources can take a variety of forms, for example a variety of different peripheral devices within a system that incorporates both the interrupt controller 10 and a number of processing units 55, 65, 75. The aim of the interrupt controller is to deliver the interrupts to the appropriate processing units 55, 65, 75 for handling, the handling of the interrupt typically involving the processing unit executing an interrupt service routine in order to process the interrupt. In accordance with the techniques described herein, each received interrupt is converted into an internal format transaction within the interrupt controller, and in particular transaction generation circuitry 20 is provided within the interrupt source interface 15 for producing such an internal format transaction. In addition, in accordance with the techniques described herein the transaction generation circuitry not only generates an original transaction to represent the interrupt, but also generates a duplicate transaction to represent that interrupt. The generated transactions are then forwarded to buffer circuitry 25 for temporary storage within the interrupt controller. The buffer circuitry can take a variety of forms, but in one implementation comprises one or more caches for temporarily storing the original and duplicate transactions.

Each of the processing units 55, 65, 75 will typically have a CPU interface 50, 60, 70, respectively, for interfacing with the interrupt controller. The interrupt controller provides an output interface 35, 40, 45 associated with each of the CPU interfaces 50, 60, 70.

The transactions held within the buffer circuitry are monitored by selection circuitry 30, which in one implementation takes the form of a pipelined circuit incorporating a number of pipeline stages. The selection circuitry can apply a number of different criteria for determining which transactions to select from the buffer circuitry, taking into account for example the priorities of the interrupts, the type and destination information for the interrupt, etc. When a transaction is selected from the buffer circuitry, it is routed through the pipeline stages of the selection circuitry and on to the output interface identified as the recipient for the transaction by the address portion of the transaction. Each output interface maintains a work queue 37, 42, 47 in which received transactions are temporarily buffered.

The selection circuitry operates so that there is a temporal separation between the selection of the original transaction and the selection of the corresponding duplicate transaction for an interrupt, and accordingly the original transaction and the duplicate transaction are routed through the selection circuitry to the output interface at different points in time. It will be appreciated that the ordering of the original transaction and the duplicate transaction is not important, and hence for example it is possible that the duplicate transaction may be forwarded to the output interface before the original transaction in some instances. The work queues 37, 42, 47 have a number of queue entries, and for any particular transaction, both the original and the duplicate copies need to have been received by the output interface, and buffered within the work queue, before the output interface can trigger the onward propagation of the interrupt to the associated CPU interface. In particular, in the techniques described herein, each output interface inhibits issuing a set signal to the CPU interface until both the original transaction and the duplicate transaction have been received into the work queue. At that point, the set signal can be issued, the set signal providing interrupt identifying information as contained within the data portion of the transaction, and hence identifying to the CPU interface information about the type of interrupt that has occurred. The CPU interface 50 will then issue an interrupt request to the associated CPU, and once accepted by the CPU will acknowledge receipt of the set signal back to the output interface. Once the acknowledgement has been received, then the output interface can clear the entry or entries that it is maintaining within the work queue for the original transaction and the duplicate transaction.

By such an approach, time redundancy can be used in order to send a physical interrupt twice through the internal components of the interrupt controller 10, and to then check that both the original and duplicate versions are delivered correctly to the output interface. This avoids the need to duplicate the entire interrupt controller in order to provide for functional safety. Further, once it is determined that the internal original and duplicate transactions have been routed to the correct output interface, it is then only necessary to send a single signal to the CPU interface, causing a single interrupt request to be issued to the corresponding processing unit, and hence it is only necessary for the processing unit to execute the interrupt service routine once for each interrupt. As such, the mechanism employed herein can be made entirely transparent to the software executing on the processing units, and has no performance impact on the operation of the processing units. This hence provides a robust and efficient mechanism for ensuring functional safety with regards to the operation of the interrupt controller within a safety critical system.

By creating internal original and duplicate transactions to represent an interrupt, and then routing those two transactions through the interrupt controller pipeline at different points in time, errors can be detected within the interrupt controller. For example, if a single event upset (SEU) occurs, and this affects the address portion of one of the original and duplicate transactions, then this would result in the original transaction and the duplicate transaction potentially being issued to different output interfaces, which would result in the detection of an error. Similarly, if such a SEU corrupted the data portion of one of the transactions, then again this can be detected since the data portions will not match for the original transaction and the duplicate transaction.

Further error detection capability can be added through the provision of a distributed time-out mechanism 80. In particular, when the transaction generation circuitry 20 generates a transaction for each received interrupt, it can reference a timer, and based thereon generate a time-out indication, also referred to herein as a future time-out value, indicating the latest time by which it is expected that the transaction will have been routed through the interrupt controller in order to trigger generation of an interrupt request to the relevant processing unit. At various places within the propagation of the transaction internally within the interrupt controller, a current time value obtained from the distributed time-out mechanism 80 can be compared against the future time-out value in order to determine whether the future time-out value has been reach or exceeded, and in that event an error can be triggered.

In one particular example implementation, the interrupt controller 10 takes the form of a generic interrupt controller (GIC) that is able to receive interrupts from a variety of different interrupt sources, and to the route those interrupts to the appropriate processing unit for handling.

Figure 2:
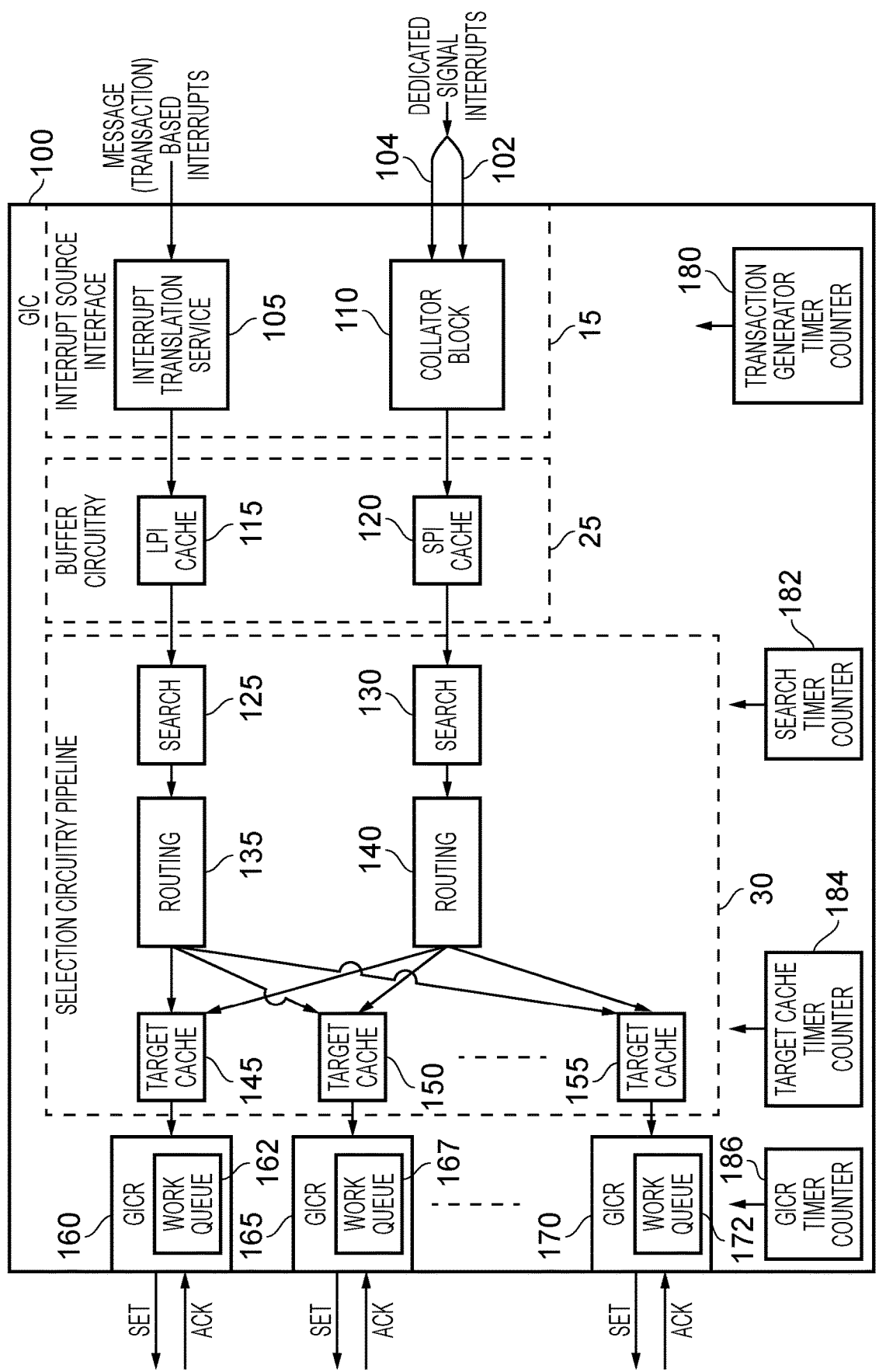
FIG. 2 is a block diagram illustrating components provided within an interrupt controller in accordance with a particular example implementation.

FIG. 2 illustrates such a GIC 100 in accordance with one particular example implementation. In this example, there are a number of different mechanisms by which the interrupts can be delivered to the GIC 100 from the various interrupt sources. For example, some interrupts may be received by asserting a signal on an associated interrupt line. An example of interrupts that may be asserted on dedicated signal lines are shared peripheral interrupts (SPIs), such as may for example be used for peripherals that are not tightly coupled to a specific processor core or cluster. As shown in FIG. 2, in one implementation the signal lines for such dedicated signal interrupts are replicated to form the two paths 102, 104 into the interrupt source interface 15, and in particular those duplicated lines are provided to a collator block 110. The duplicated input lines 102, 104 are provided to make sure that the proposed scheme works for both edge sensitive and level sensitive interrupts.

The collator block 110 is responsible for generating an internal format transaction to represent each received interrupt, and in particular in accordance with the techniques described herein generates both an original transaction and a duplicate transaction for each received interrupt, with both the original and duplicate transactions having the same address portion to identify the output interface (also referred to herein as the GIC redistributor (GICR)) to which the transaction should be routed through the GIC 100, and the same data portion to provide the required interrupt identifying information to enable the recipient CPU to execute an appropriate interrupt service routine. The generated transactions are then stored within a cache 120 within the buffer circuitry 25. Herein, the cache will be referred to as the SPI cache.

However, in addition to interrupts that are asserted by dedicated signal lines, message based interrupts may also be received by the interrupt source interface 15. Instead of using a dedicated signal line, in accordance with a message based interrupt (MBI) scheme a peripheral device writes to a register in the GIC in order to register an interrupt. The MBI can be viewed as being a transaction based interrupt, but needs converting into the internal transaction format used within the GIC 100. In order to perform this function, an interrupt translation service (ITS) entity 105 can be provided within the interrupt source interface 15, and is used to perform a logical to physical interrupt binding between the received message based interrupt and the physical interrupt represented by the internal transaction routed through the GIC 100. The ITS will hence determine the appropriate GICR 160, 165, 170 to which the received MBI should be routed, and store that information in an address portion of the transaction, and will also create a data portion for the transaction, to include an interrupt identifier and associated information providing the interrupt identifying information required when communicating with the CPU interface to identify the type of interrupt that needs handling.

An example of message based interrupts that may be received by the ITS 105 are locality-specific peripheral interrupts (LPIs). LPI transactions generated by the ITS 105 are then forwarded to the cache 115 within the buffer circuitry 25, this cache being referred to herein as an LPI cache.

The selection circuitry pipeline 30 comprises a number of components. In particular search circuitry 125, 130 is associated with each of the caches 115, 120, and is arranged to monitor the contents of the caches and apply selection criteria in order to determine which transaction to retrieve from the cache at any particular point in time, for routing through the selection circuitry pipeline to the relevant GICR 160, 165, 170. As will be understood by those skilled in the art, a number of criteria can be taken into account at this point, such as the priority and security of the interrupts represented by the transactions in the respective caches, the destination to which the transactions are to be routed, etc.

Each retrieved transaction is then passed through the routing circuitry 135, 140 to the relevant target cache 145, 150, 155, in this embodiment a separate target cache being provided in association with each GICR 160, 165, 170. The contents of the target cache can then be provided on to the associated GICR for storing in the associated work queue 162, 167, 172 of that GICR. In particular, as space becomes available within the work queues, transactions held in the target caches can be forwarded on to those work queues. It should be noted that the target caches can also receive transactions pushed back from the work queues.

As mentioned earlier, in accordance with the techniques described herein, only once both the original transaction and its associated duplicate transaction have been received into a work queue 162, 167, 172 will the GICR 160, 165, 170 determine that the associated interrupt is ready for delivery to the CPU interface connected to that GICR. As discussed earlier, at this point the GICR 160 can assert a set signal to the CPU interface, providing the interrupt identifying information contained within the data portion of the transaction. The CPU interface will then issue a suitable interrupt request to the associated processing unit, and will also send an activation acknowledgement signal back to the GICR once the processing unit has accepted the interrupt request. At that point, both the original and duplicate transaction entries within the work queue can be deleted. As will be discussed in more detail later, in one implementation a single entry in the work queue is used to represent both the original transaction and the duplicate transaction, and accordingly it is only a single entry that needs to be invalidated at that time, this freeing up space within the work queue for another transaction to be received from the associated target cache 145, 150, 155 of the selection circuitry pipeline 30.

In the example illustrated in FIG. 2, the distributed time-out mechanism 80 of FIG. 1 is represented by the various timer counters 180, 182, 184, 186 shown in FIG. 2. In particular, a separate timer counter can be associated with each of a number of different blocks within the GIC 100. In this instance, a transaction generator timer counter 180 is associated with the interrupt source interface 15, and in particular can be referred to by both the collator block 110 and the ITS 105 when generating internal format transactions.

Figure 3:
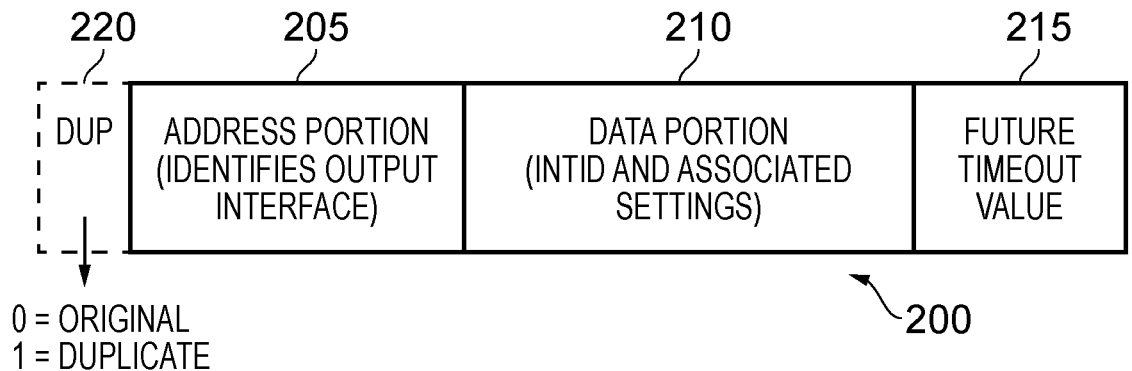
FIG. 3 schematically illustrates an internal transaction format used to represent interrupts within the interrupt controller in accordance with one example implementation.

FIG. 3 illustrates the internal transaction format 200 in accordance with one example implementation. As shown, an address portion 205 is used to identify the output interface, i.e. the GICR 160, 165, 170 in the example of FIG. 2, to which the transaction is to be routed, and a data portion that provides an interrupt identifier (INTID) and associated settings for the interrupt. These associated settings can for instance include a priority indication, configuration information (for example whether the interrupt is level or edge sensitive), and security group information which can be used to determine the type of interrupt asserted to the processing unit in due course. For example, in one particular implementation group 0 interrupts are always secure and signalled as a fast interrupt request (FIQ), regardless of the current security state of the CPU receiving the interrupt. Secure group 1 interrupts are signalled as an FIQ if the processor core is in the non-secure state, but are signalled as a standard interrupt request (IRQ) if the core is in the secure state. Similarly, a non-secure group 1 interrupt is signalled as an FIQ if the core is in the secure state, and signalled as an IRQ if the core is in the non-secure state.

As also shown in FIG. 3, a field 215 can be provided within the internal transaction format to provide a future time-out value. In particular, at the time the transaction is generated by the collator block 110 or the ITS 105, the transaction generator timer counter 180 is referred to in order to obtain a current count value. This is then used to generate a future time-out value, for example by adding a predetermined offset to the current counter value. The offset may be chosen so as to represent the maximum expected time it will take for the transaction to be routed through the GIC resulting in the generation of an asserted set signal to the CPU interface.

As also shown in FIG. 3, a duplicate field 220 may be provided as part of the internal transaction format, a first value in that field indicating that the transaction is an original transaction, and a second value in that field indicating that the transaction is a duplicate transaction. A sideband signal may then be propagated through the GIC in association with the duplicate transaction to identify that it is the duplicate version rather than the original version.

Considering the use of the future time-out value provided within the field 215 of each internal transaction 200, then that future time-out value can be reviewed at various places within the GIC in order to determine whether the future time-out value has now been reached or not. Hence, for example, the search stage components 125, 130 can refer to the current value of the search timer counter 182 in order to obtain a current count value, and then compare that against the future time-out value in the field 215. If the future time-out value has been reached or exceeded, then an error signal can be triggered. The same check can also be performed by other components. For example, each of the target caches 145, 150, 155 may be arranged to reference the target cache timer counter 184 each time a transaction is to be output from the target cache to the GICR, and if the future time-out value has been reached or exceeded, then an error signal can be generated. Similarly, the GICR components 160, 165, 170 can reference the GICR timer counter 186 each time an entry is to be read from the work queue 162, 167, 172, and again can assert a time-out error if the future time out value has been exceeded.

Each of the various timer counters 180, 182, 184, 186 are in one implementation separate counters provided in close proximity to the associated components, but arranged to be synchronised with each other. In an alternative implementation a global counter could be maintained if desired.

Figure 4:
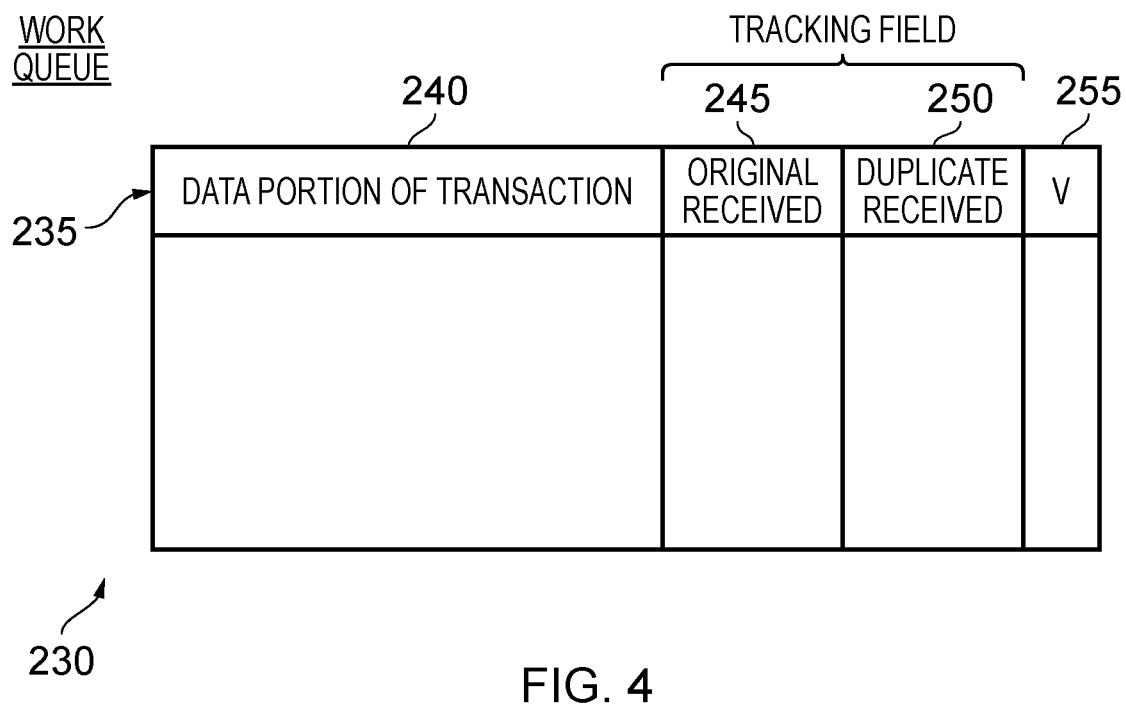
FIG. 4 schematically illustrates fields that may be provided within each entry of the work queues illustrated in FIG. 1 or FIG. 2, in accordance with one example implementation.

The work queues can be organised in a variety of ways, but in one implementation each entry takes the form illustrated in FIG. 4. In particular, in the example of FIG. 4, the work queue 230 includes a plurality of entries 235, where each entry has a field 240 for maintaining the data portion of the transaction, and a tracking field made up of the sub-fields 245, 250 in order to track when the original version and duplicate version of the transaction are received into the work queue. A valid bit 255 may also be provided to identify whether the corresponding entry is valid or not. Any invalid entry is available to receive a new transaction from the associated target cache.

In one implementation, the tracking field is a two-bit field, and hence each of the sub-fields 245, 250 is a single bit value which can be set or cleared dependent on whether the associated original or duplicate version of the transaction has been received. In one implementation, a GICR will only select transactions for onward propagation to the associated CPU interface when the entry for that transaction identifies that both the original transaction and the duplicate transaction have been received. The field 240 comprises all of the required information about the interrupts that will need to be propagated via the set signal to the CPU interface.

Figure 5:
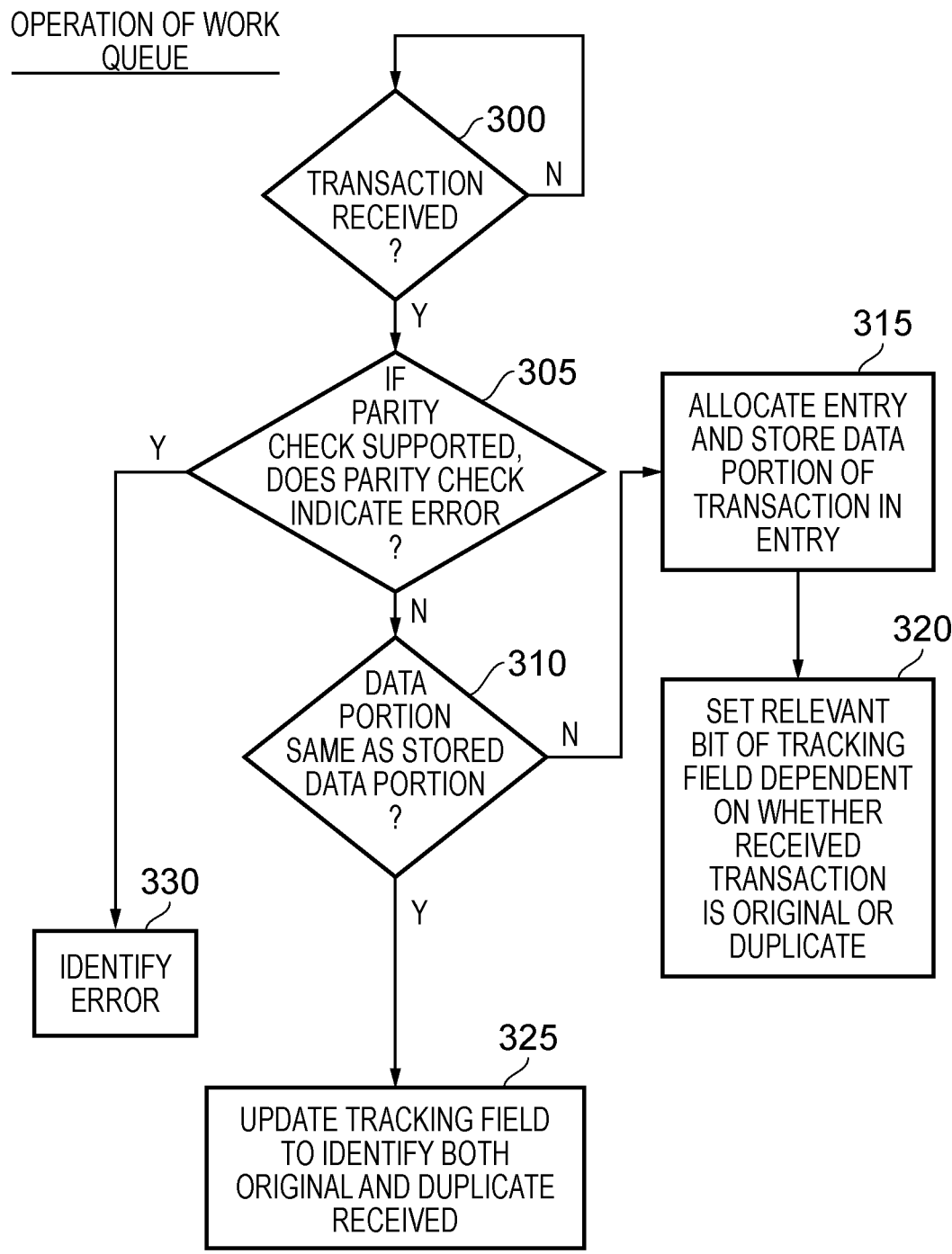
FIG. 5 is a flow diagram illustrating how the entries in a work queue are populated in accordance with one example implementation.

FIG. 5 is a flow diagram illustrating how the entries of the work queues within the various GICR components shown in FIG. 2 are populated in accordance with one example implementation. At step 300, it is determined whether a transaction has been received, and if so at step 305 a parity check may be performed if parity bit checking is supported in order to determine whether there is an error in the received transaction. If so, then the process proceeds to step 330 where an error is identified.

If at step 305 no error is detected the process proceeds to step 310, or proceeds directly to step 310 from step 300 if parity checking is not implemented. At step 310, a pair matching process is performed to see if there is already an entry in the work queue for the received transaction. If not, this means that the received transaction is the first transaction of the original/duplicate pair, and accordingly the process proceeds to step 315 where an entry is allocated into the work queue, and the data portion of the transaction is stored in that entry. Further, at step 320 the relevant bit of the tracking field 245, 250 is set dependent on whether the received transaction is the original or duplicate transaction, as may be inferred for example from the duplicate field 220 of the transaction. At this point, the valid bit 255 will also be set for the entry.

If at step 310 it is determined that there is already an entry in the work queue for that transaction, then this means that the received transaction is the second of the original/duplicate pair. Accordingly, the process proceeds to step 325 where the tracking field 245, 250 is updated to identify that both the original and duplicate transactions have now been received. As discussed earlier, at this point the entry becomes a valid candidate entry for selection by the GICR in order to generate a set signal to the associated CPU interface.

Figure 6:
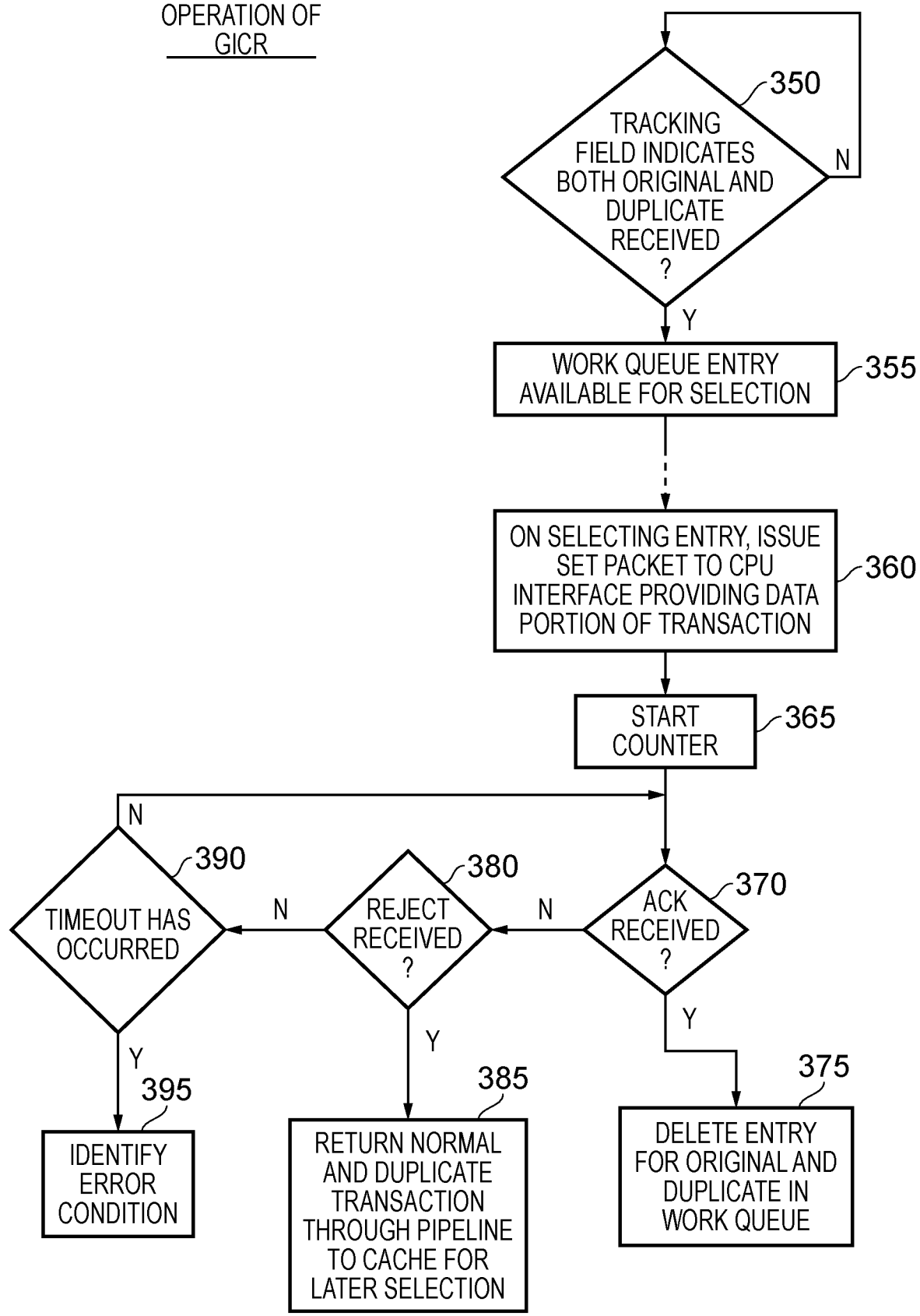
FIG. 6 is a flow diagram illustrating the operation of the generic interrupt controller redistributor (GICR) elements of FIG. 2 in accordance with one example implementation.

FIG. 6 illustrates the operation of each GICR component 160, 165, 170 once it is able to select a queue entry that has both the original and duplicate transactions indicated as having been received. Accordingly, at step 350 it is determined whether the tracking field for a work queue entry indicates that both the original and duplicate transactions have been received, and when that is the case that work queue entry becomes available for selection, as indicated by step 355. It may not however actually be selected by the GICR at this stage, as the GICR may apply any of a number of known selection schemes to determine which work queue entry to select next from the work queue. However, at some subsequent point, as indicated by step 360, the work queue entry will be selected (the selection for example being made based on priorities of the outstanding interrupts represented in the work queue), and will result in the issuance of a set packet to the associated CPU interface providing the data portion of the transaction, as held in the field 240 of the work queue entry.

As indicated as step 365, a counter is then started at the time the set signal is asserted, and at step 370 it is determined whether an acknowledgement has been received from the CPU interface. If it has, then the corresponding work queue entry can be marked as invalid/deleted for the original and duplicate transactions in the work queue at step 375, since that information is no longer required.

If an acknowledgement has not yet been received, it is checked whether a reject signal has been received at step 380, i.e. whether the CPU interface has indicated that the CPU is not accepting the interrupt. In that situation, the process proceeds to step 385 where both the normal and duplicate transactions are returned through the pipeline stages of the selection circuitry pipeline 30 for repopulation within the respective cache structure 115, 120 of the buffer circuitry 25. At this point, the work queue entry can be invalidated, and in due course the search stage components 125, 130 will reselect the transactions from the cache for propagation back to the GICR.

If it is determined at step 380 that a reject signal has not been received, then the process proceeds to step 390 where it is determined whether a time-out has occurred. In particular, at this point it is checked whether the counter that was started at step 365 has yet reached a threshold value. If it has, then this indicates some unexpected problem in the handling of the interrupt, and the process proceeds to step 395 where an error condition is identified. Otherwise, the process returns to step 370. It will be appreciated that at some point the yes path will be followed from one of steps 370, 380, or 390.

Figure 7:
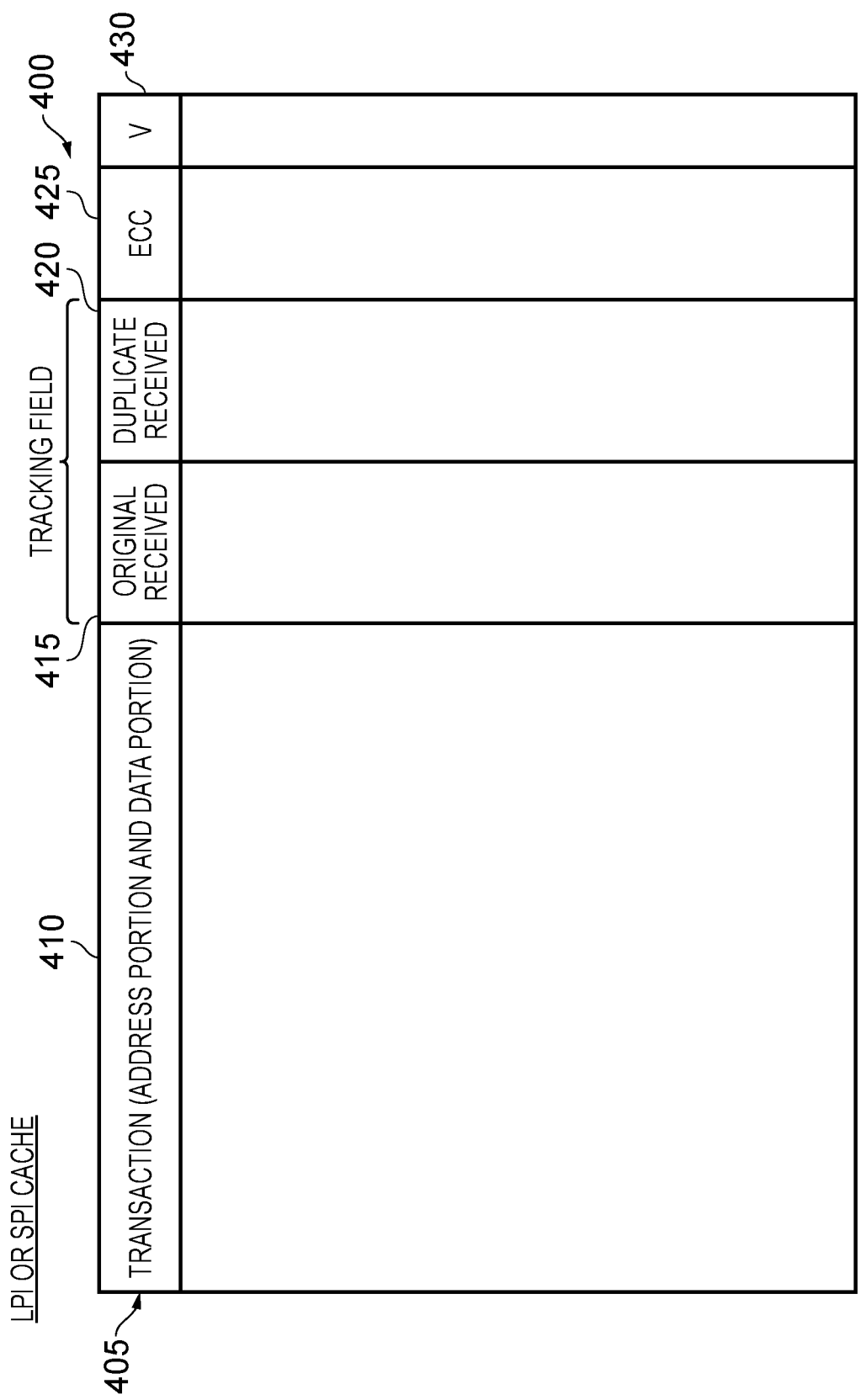
FIG. 7 schematically illustrates fields that may be provided within each entry of the caches within the buffer circuitry of FIG. 2 in accordance with one example arrangement.

FIG. 7 schematically illustrates fields that may be provided in association with each entry within the LPI cache 115 or the SPI cache 120 of FIG. 2, in accordance with one example implementation. In this example implementation, both the original and duplicate transactions generated by the corresponding transaction generation components 105, 110 are stored within the same entry in the cache, and accordingly a tracking field is provided consisting of the sub-fields 415, 420, which operate in much the same manner as the earlier-discussed sub-fields 245, 250 of the work queue entries. In an alternative implementation separate entries may be allocated for the original and duplicate transactions.

Each entry 405 within the LPI or SPI cache has a field 410 for holding the transaction information. This will include the address portion 205 and data portion 210 of the transaction, and will also include the future time-out value 215 in implementations where that future time-out value is included as part of the transaction. The field 410 will also include the duplication field 220 where such a field is used as part of the internal transaction format.

As indicated in FIG. 7, an error correction code (ECC) field 425 can also be provided for each entry, to provide error correction code information used to enable the detection and correction of errors within certain of the information maintained within the entry. In one implementation, this may enable detection and correction of errors in the information maintained within the tracking field, or alternatively can provide sufficient ECC information to enable the detection and correction of one or more errors within any of the content of the entry 405. A valid flag 430 can also be associated with each entry to identify whether the contents are valid.

Figure 8A:
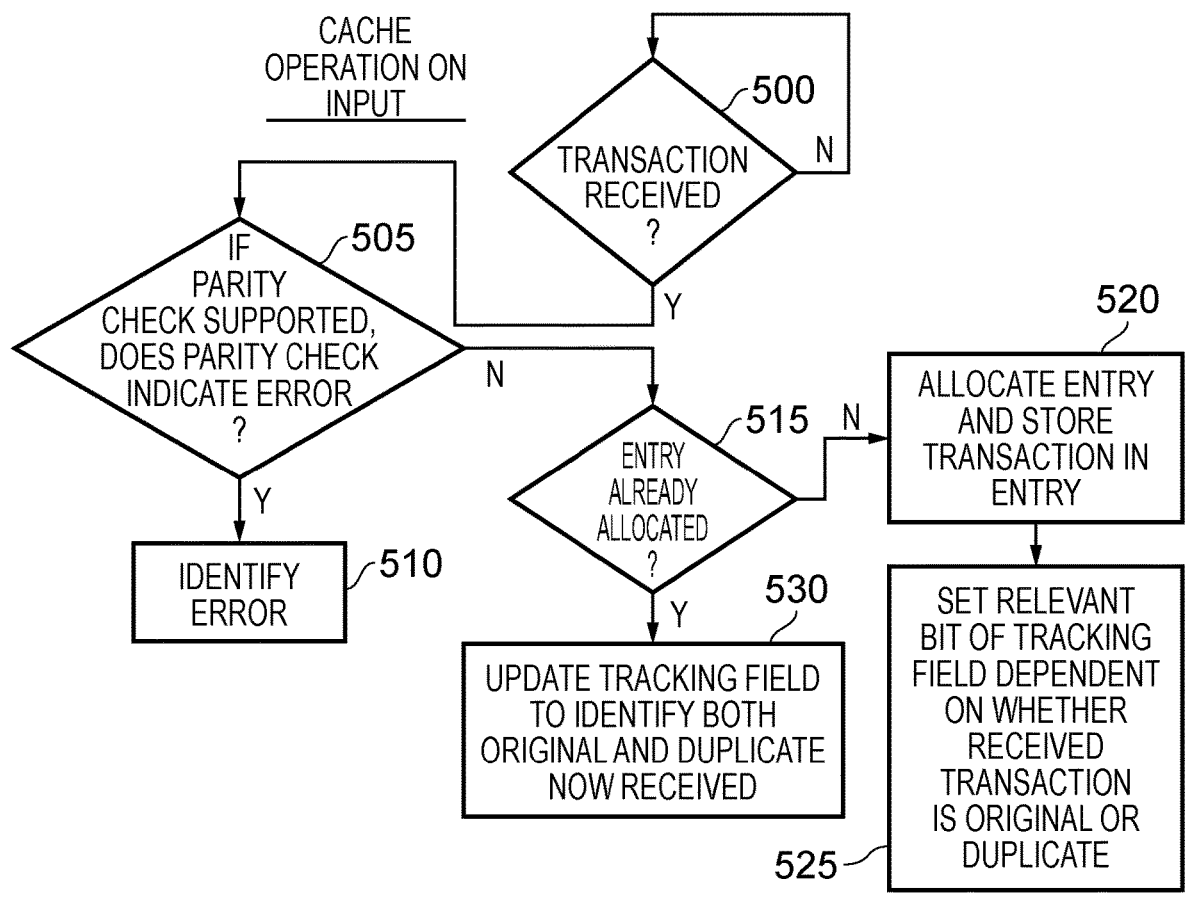
FIGS. 8A and 8B illustrate the operation of the caches of the buffer circuitry of FIG. 2 in accordance with one example arrangement.

FIG. 8A is a flow diagram illustrating the operation of the caches 115, 120 when a transaction is received for storing therein from the corresponding transaction generation component 105, 110. At step 500, it is determined whether a transaction has been received, and if so the process then proceeds to step 505, where if parity checking is supported it is determined whether an error is detected in the received transaction. If so then at step 510 an error is identified, but otherwise the process proceeds to step 515, or proceeds directly from step 500 to step 515 if parity checking is not implemented.

At step 515 it is determined whether there is an entry already allocated for that transaction by performing a matching process to seek to detect a match with the transactions already stored in an entry of the cache. If an entry has not already been allocated, this indicates that the received transaction is the first transaction in the original/duplicate pair, and accordingly the process proceeds to step 520 in order to allocate an entry within the cache and store the transaction information in the field 410 of the allocated entry 405. The process then proceeds to step 525 where the relevant bit of the tracking field is set dependent on whether the received transaction is the original transaction or the duplicate transaction. At this point, the valid bit 430 can also be set to identify that the contents of the entry 405 are valid, and the ECC field 425 can be populated with ECC information.

If at step 515 it is determined that an entry is already allocated for the transaction, then this indicates that the received transaction is the second transaction in the pair of the original/duplicate transactions, and the process then proceeds to step 530 where the tracking field 415, 420 is updated to identify that both the original and duplicate transactions have now been received.

Figure 8B:
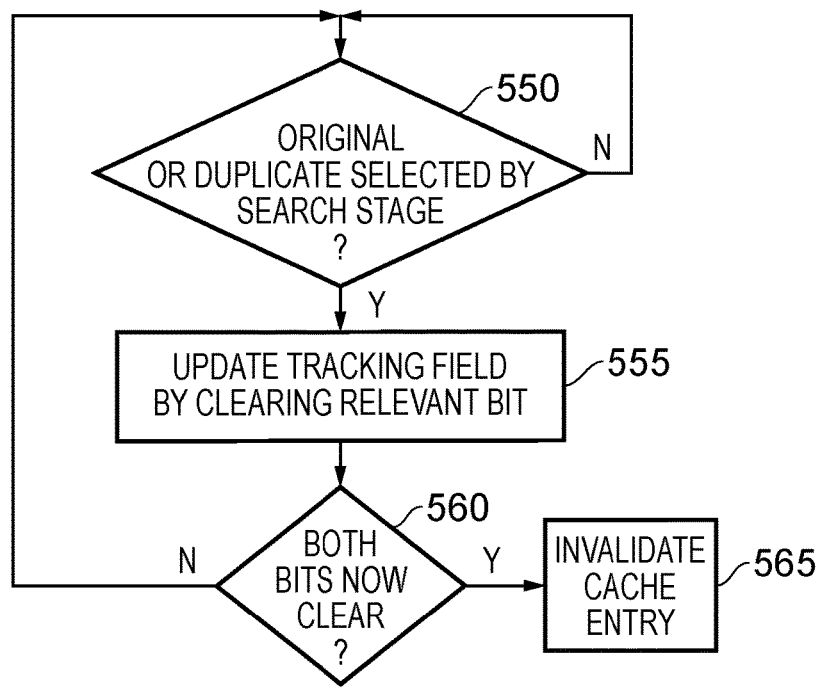

FIG. 8B illustrates the operation of the caches 115, 120 at the time one of their entries is selected by the associated search stage components 125, 130. As mentioned earlier, in one example implementation the search stage components 125, 130 can only select an entry in the cache whose tracking field information 415, 420 indicates that both the original and duplicate transactions have been received. In one example implementation, the search stage components 125, 130 will identify whether they are selecting the original transaction or the duplicate transaction. Alternatively, there may be a predetermined order in which the transactions are selected, for example the first time the entry is accessed, the original transaction may be selected, and the second time the entry is accessed the duplicate transaction may be selected.

At step 550, it is determined whether it is the original or the duplicate transaction that has been selected by the search stage, and then at step 555 the tracking field is updated by clearing the relevant bits 415, 420, dependent on which transaction has been selected.

At step 560, it is determined whether both bits in the tracking field are now clear, and if not the process returns to step 550 to await selection of the remaining transaction in the pair. However, once both bits are clear, then the cache entry can be invalidated at step 565, by clearing the valid flag 430. This frees up the cache entry 405 for allocation to another transaction generated by the associated transaction generation components 105, 110.

It should be noted that if the caches 115, 120 do not maintain consolidated entries for the original and duplicate transactions, but instead merely allocate separate entries for them, the checking process of FIGS. 8A and 8B may not be performed, and instead the check will be performed once at the relevant output interface, using the earlier discussed process of FIG. 5.

Figure 9:
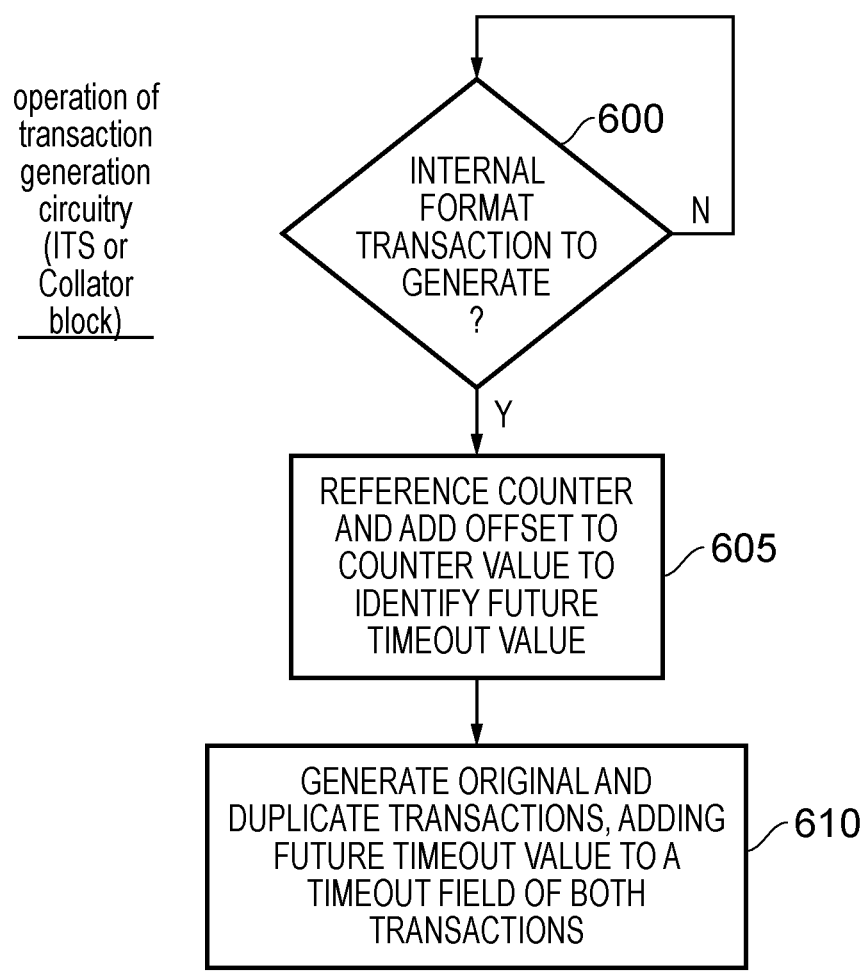
FIG. 9 is a flow diagram illustrating the operation of the transaction generation circuitry in accordance with one example implementation.

FIG. 9 is a flow diagram illustrating the operation of the transaction generation circuitry (which may for example be the interrupt translation service 105 or the collator block 110 depending on the type of interrupt received by the GIC 100), and in particular the operation of that transaction generation circuitry in order to generate the future time-out value that is included in field 215 of each transaction 200. At step 600, the transaction generation circuitry determines whether there is an internal format transaction to be generated, this being the case when an interrupt is presented from an interrupt source to the corresponding interface of the transaction generation circuitry. At that point, the process proceeds to step 605, wherein in addition to performing all of the earlier-described steps to generate an internal format transaction having an address portion and a data portion, the transaction generation circuitry also references the transaction generator timer counter 180 in order to obtain a current count value, and then adds an offset to that count value in order to identify a future time-out value. Then, at step 610 when the original and duplicate transactions are generated, the future time-out value is added to the time-out field 215 of both transactions.

Figure 10:
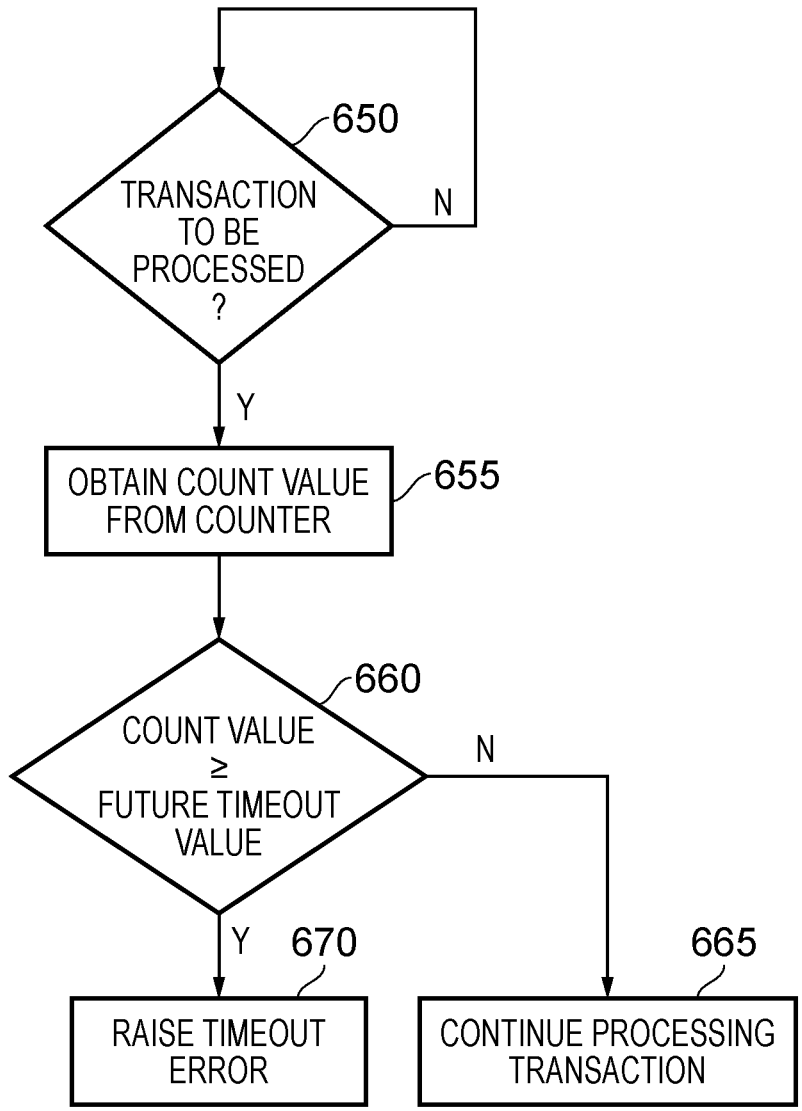
FIG. 10 is a flow diagram illustrating how a timer comparison process may be implemented in one example implementation in order to detect time-out errors.

FIG. 10 is a flow diagram illustrating the timer comparison operation that can be performed by various components within the GIC. In one example implementation, such as shown in FIG. 2, the steps identified in FIG. 10 are performed by the search stage blocks 125, 130 when a transaction is retrieved from the associated cache, by the target caches 145, 150, 155 when an entry is output from the target cache to the corresponding GICR 160, 165, 170, and by each of the GICRs 160, 165, 170 when an entry in a corresponding work queue 162, 167, 172 is retrieved during the process of creating a set packet to be forwarded to the associated CPU interface. At step 650, it is determined whether a transaction is to be processed by such a component, and if so then at step 655 a count value is obtained from the associated counter 182, 184, 186. It is then determined at step 660 whether the count value is greater than or equal to the future time-out value held in field 215 of the transaction. If not, then the process proceeds to step 665 where the component continues to process the transaction as normal. However, otherwise, the process proceeds to step 670 where a time-out error is asserted.

Such time-out error information can be reported individually, or can be aggregated and then reported to management hardware or a suitable software utility.

In order to reduce the amount of comparison logic required to compare a current count value with the future time-out value, the value of the future time-out value can be relatively coarse-grained if desired (effectively setting to zero a certain number of least significant bits of the time-out value).

Figure 11:
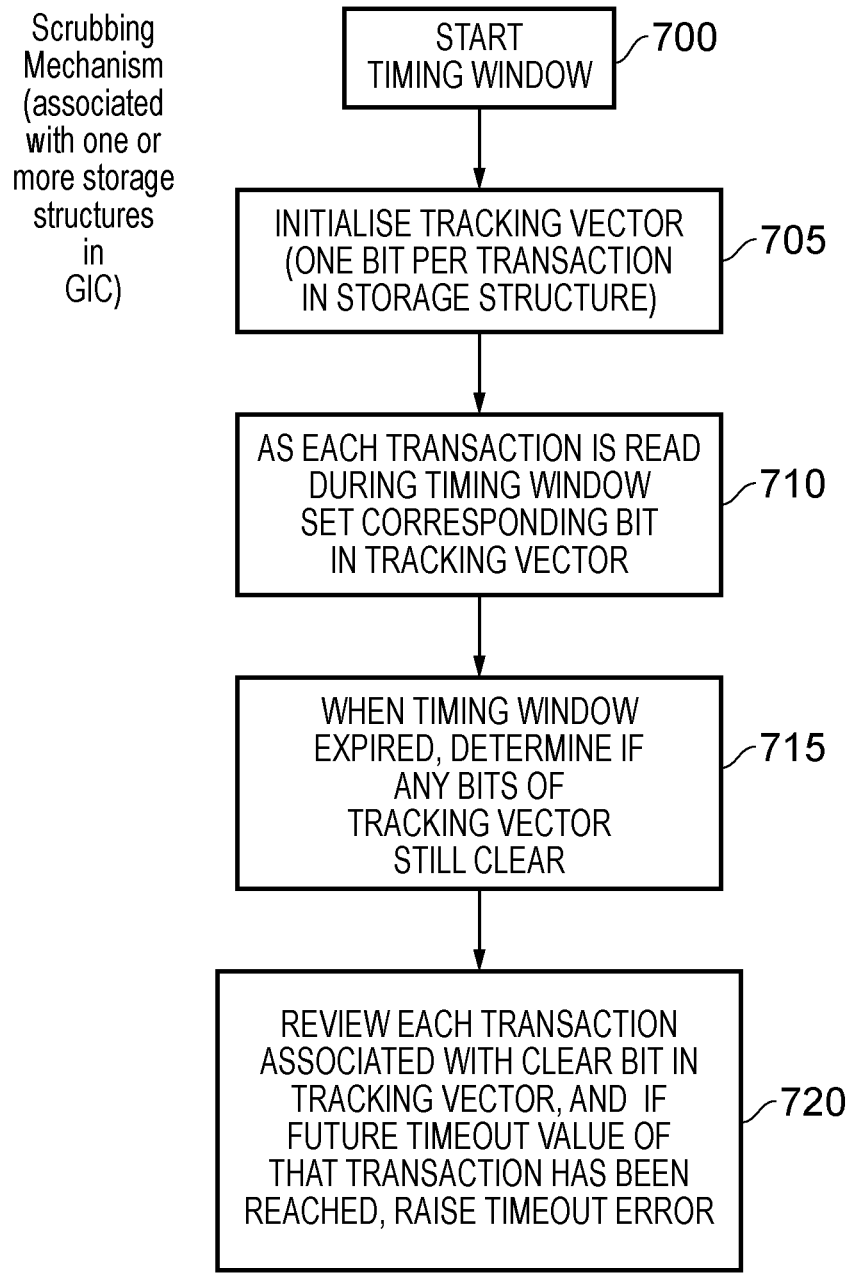
FIG. 11 is a flow diagram illustrating a scrubbing mechanism that may be employed in one example implementation in order to detect time-out errors.

As mentioned earlier, it is possible that some transactions may be retained within a storage structure and not retrieved due to an erroneous condition within the GIC. This could for example arise due to a hardware defect causing certain portions of the storage structure to always be skipped. In such a scenario, it would be desirable to provide a mechanism to detect the presence of such transactions that are still within the storage structures, and whose future time-out values have expired. In order to achieve this, a scrubbing mechanism can be implemented in association with one or more of the storage structures in the GIC, for example in association with the caches 115, 120, with the target caches 145, 150, 155 and/or in association with the work queues 162, 167, 172. The scrubbing mechanism can take a variety of forms, but one example implementation is illustrated by the flow diagram of FIG. 11.

At step 700, a timing window is started, and step 705 a tracking vector is initialised, which may for example comprise one bit for each transaction in the storage structure (where pairs of transactions are stored in a single entry the tracking vector may hence have two bits per entry). At step 710, as each transaction is read during the timing window, a corresponding bit may be set in the tracking vector.

At step 715, when the timing window has expired, it is determined if any bits of the tracking vector are still clear. If they are still clear, then this indicates that during the timing window the corresponding transaction has not been accessed.

Accordingly, at step 720 each transaction in the storage structure associated with a clear bit in the tracking vector is reviewed, and if the future time-out value of that transaction has been reached, then a time-out error is raised.

As will be apparent from the above discussion of example implementations, the use of the techniques described herein avoid the requirement for full duplication of an interrupt controller in order to provide functional safety, and enable functional safety to be achieved without needing to send duplicate interrupt requests to a CPU, and hence without needing to invoke an interrupt service routine multiple times within a CPU for each interrupt. This hence provides for a very area efficient functional safe GIC design.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An interrupt controller comprising:
an interrupt source interface to receive interrupts from one or more interrupt sources;
a plurality of output interfaces, each output interface being associated with a processing device that is arranged to execute an interrupt service routine to process an interrupt request issued to that processing device;
the interrupt source interface comprising transaction generation circuitry that is arranged, for each received interrupt, to generate an original transaction to represent the interrupt and a duplicate transaction to represent the interrupt;
buffer circuitry to buffer the original transaction and the duplicate transaction for each received interrupt; and
selection circuitry to select transactions from the buffer circuitry and to route each selected transaction for receipt by the output interface identified by an address portion of that selected transaction;
each output interface having queue storage, the queue storage comprising a plurality of queue entries, each queue entry being allocated to a transaction received by the output interface and used to store interrupt identifying information provided by a data portion of the transaction, and the queue storage being arranged to maintain duplication tracking information to identify when both the original transaction and its associated duplicate transaction have been received by the output interface;
wherein each output interface is arranged to inhibit issuing an output signal to cause an interrupt request for the original transaction to be sent to the associated processing device until the duplication tracking information identifies that both the original transaction and the associated duplicate transaction have been received by that output interface.

2. An interrupt controller as claimed in claim 1, wherein: the original transaction and the associated duplicate transaction are allocated to the same queue entry within the queue storage, and each queue entry comprises a tracking field to maintain the duplication tracking information for the original transaction and the associated duplicate transaction allocated to that queue entry.

3. An interrupt controller as claimed in claim 1, wherein the selection circuitry is arranged such that there is a temporal separation between selection of the original transaction and selection of the duplicate transaction from the buffer circuitry.

4. An interrupt controller as claimed in claim 1, wherein:
the buffer circuitry comprises a plurality of buffer entries, and the original transaction and the associated duplicate transaction are allocated to separate buffer entries within the buffer circuitry.

5. An interrupt controller as claimed in claim 1, wherein:
the buffer circuitry comprises a plurality of buffer entries, and the original transaction and the associated duplicate transaction are allocated to a single buffer entry within the buffer circuitry, each buffer entry having a buffer tracking field to identify when the original transaction and the associated duplicate transaction have been received by the buffer circuitry.

6. An interrupt controller as claimed in claim 1, wherein:
the duplicate transaction includes a duplication attribute to identify it as a duplicate transaction, and the duplication attribute is retained by the duplicate transaction as that duplicate transaction passes through the interrupt controller.

7. An interrupt controller as claimed in claim 1, wherein:
each output interface is coupled to a processing device interface;
the output interface is arranged to issue the output signal to the processing device interface, the output signal specifying the interrupt identifying information provided by the data portion of the original transaction for which the output signal is being issued, to cause the processing device interface to respond to the output signal by asserting the interrupt request to the processing device; and
the output interface is responsive to receipt of an acknowledgement signal from the processing device interface indicating that the processing device has accepted the interrupt request, to remove the associated original transaction and duplicate transaction from the queue storage.

8. An interrupt controller as claimed in claim 1, wherein each output interface is arranged to employ an error detection scheme to identify an error condition when a difference between the original transaction and the associated duplicate transaction is detected.

9. An interrupt controller as claimed in claim 1, wherein:
the transaction generation circuitry at the interrupt source interface is arranged, when processing a received interrupt, to determine an expiry time with reference to a generation time, and to incorporate an indication of the expiry time as an attribute of the generated original transaction and associated duplicate transaction; and
at one or more locations within the interrupt controller, the expiry time is compared against a compare time to determine if the expiry time has been reached, and in the event that the expiry time has been reached the interrupt controller is arranged to identify an error condition.

10. An interrupt controller as claimed in claim 1, wherein the interrupt source interface comprises dedicated signal interrupt interface circuitry associated with received interrupts that are provided by dedicated signals on a group of input lines.

11. An interrupt controller as claimed in claim 1, wherein the interrupt source interface comprises transaction interrupt interface circuitry associated with received interrupts that are provided as transactions, each received transaction being processed by the transaction interrupt interface circuitry to form a corresponding original transaction and associated duplicate transaction.

12. An interrupt controller as claimed in claim 2, wherein the tracking field is a two-bit field comprising a first bit which is set when the original transaction is received and a second bit which is set when the associated duplicate transaction is received.

13. An interrupt controller as claimed in claim 5, wherein:
the selection circuitry is prevented from selecting either the original transaction or the duplicate transaction from the buffer circuitry until the buffer tracking field identifies that both the original transaction and its associated duplicate transaction have been received by the buffer circuitry.

14. An interrupt controller as claimed in claim 5, wherein as each of the original transaction and the associated duplicate transaction for a chosen buffer entry are selected by the selection circuitry, the buffer tracking field is updated to identify that selection.

15. An interrupt controller as claimed in claim 5, wherein an error correction mechanism associated with each buffer entry is used to facilitate correction of errors in information maintained in the buffer tracking field.

16. An interrupt controller as claimed in claim 7, wherein the output interface is arranged to start a timer when the output signal is issued, and in the absence of receipt of the acknowledgement signal by a time the timer reaches a chosen threshold value, the output interface is arranged to identify an error condition.

17. An interrupt controller as claimed in claim 9, wherein:
the generation time and the compare time are determined from a value of a counter, and the expiry time is determined by adding a chosen offset to the generation time.

18. An interrupt controller as claimed in claim 9, wherein said one or more locations comprises at least each output interface, enabling the error condition to be identified when at least one of the original transaction and the associated duplicate transaction are processed by the output interface after the expiry time has been reached.

19. An interrupt controller as claimed in claim 9, further comprising scrubbing circuitry to review entries in one or more storage structures of the interrupt controller to determine presence of the error condition if an entry stores a transaction whose associated expiry time has been reached.

20. An interrupt controller as claimed in claim 19, wherein the scrubbing circuitry employs a tracking mechanism to track which entries have been reviewed.

21. An interrupt controller as claimed in claim 10, wherein the group of input lines are duplicated to cause each interrupt to be received twice by the dedicated signal interrupt interface circuitry.

22. An interrupt controller as claimed in claim 10, wherein the dedicated signal interrupt interface circuitry comprises collator circuitry to convert each received interrupt into a corresponding original transaction and associated duplicate transaction.

23. An interrupt controller as claimed in claim 11, wherein the transaction interrupt interface circuitry comprises interrupt translation circuitry to convert interrupt information provided in the received transaction into the address portion of the original transaction and the duplicate transaction used to identify the output interface to which the original transaction and the duplicate transaction should be routed.

24. An interrupt controller as claimed in claim 14, wherein the chosen buffer entry is available for reallocation once the buffer tracking field identifies that both the original transaction and associated duplicate transaction currently allocated to the chosen buffer entry have been selected by the selection circuitry.

25. A method of operating an interrupt controller, comprising:
receiving at an interrupt source interface interrupts from one or more interrupt sources;
providing a plurality of output interfaces, each output interface being associated with a processing device that is arranged to execute an interrupt service routine to process an interrupt request issued to that processing device;
employing transaction generation circuitry, for each received interrupt at the interrupt source interface, to generate an original transaction to represent the interrupt and a duplicate transaction to represent the interrupt;
buffering in buffer storage the original transaction and the duplicate transaction for each received interrupt;
selecting transactions from the buffer storage, and routing each selected transaction for receipt by the output interface identified by an address portion of that selected transaction;
providing each output interface with queue storage, the queue storage comprising a plurality of queue entries, each queue entry being allocated to a transaction received by the output interface and used to store interrupt identifying information provided by a data portion of the transaction;
maintaining, in the queue storage, duplication tracking information to identify when both the original transaction and its associated duplicate transaction have been received by the output interface; and
causing each output interface to inhibit issuing an output signal to cause an interrupt request for the original transaction to be sent to the associated processing device until the duplication tracking information identifies that both the original transaction and the associated duplicate transaction have been received by that output interface.

* * * * *